Sept. 13, 1932.   B. BRONSON   1,876,849
STEEL AND RUBBER PRODUCT
Filed Dec. 5, 1927
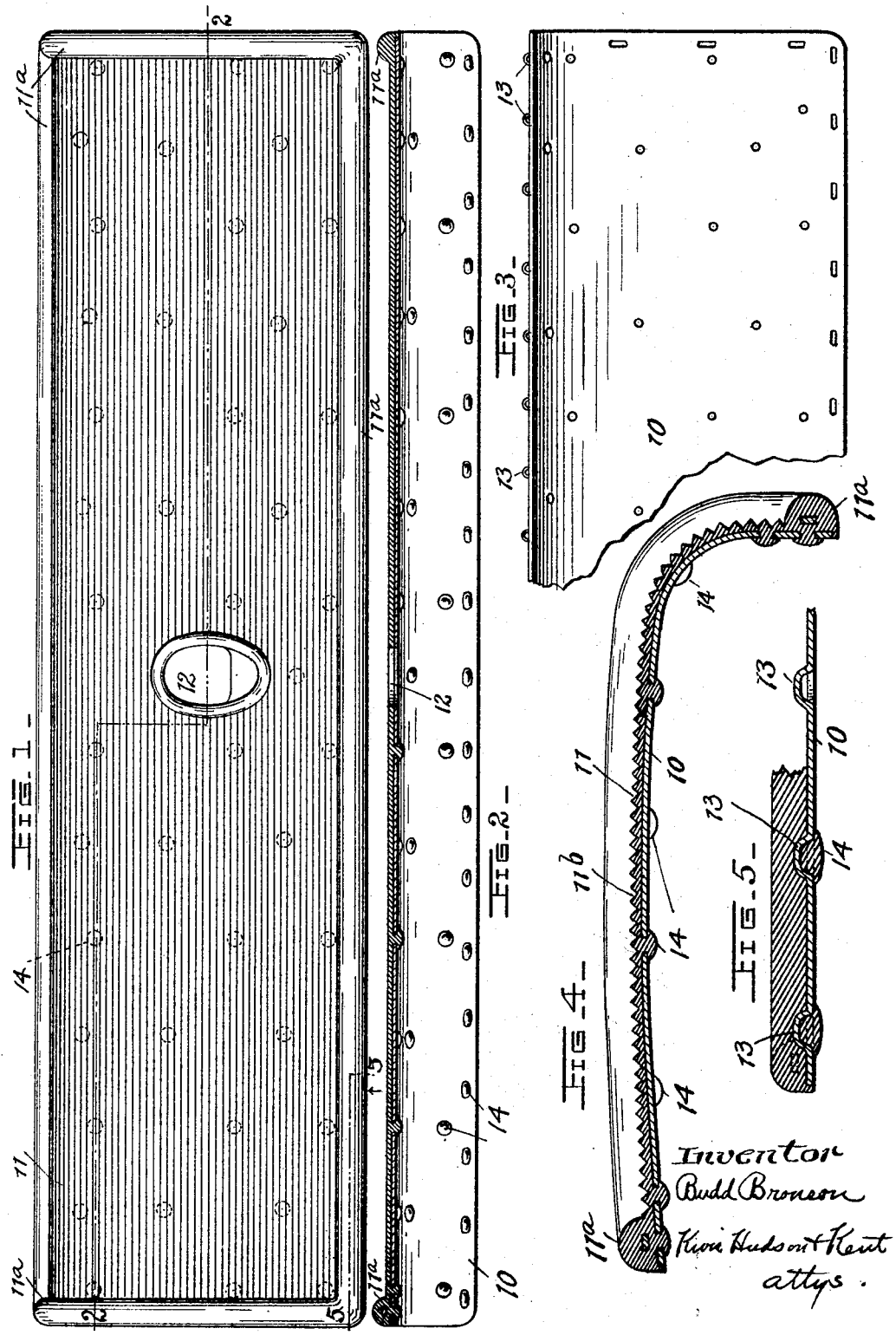

Patented Sept. 13, 1932

1,876,849

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

STEEL AND RUBBER PRODUCT

Application filed December 5, 1927. Serial No. 237,801.

This invention relates to a combined rubber and steel product consisting preferably of a sheet metal base member to which has been vulcanized and secured a covering of rubber. The primary object of the invention is to provide an article of this kind of novel form or construction with a rubber covering on one side secured to the base member in a novel and effective manner, or in such a way that rough usage is not liable to disengage the rubber from the metal base.

In the accompanying sheet of drawing illustrating my invention,

Figure 1 is a top plan view.

Figure 2 is a longitudinal sectional view along the irregular line 2—2 of Fig. 1.

Figure 3 is a fragmentary bottom view.

Figure 4 is an enlarged transverse sectional view, and

Figure 5 is an enlarged fragmentary sectional view substantially along the line 5—5 of Fig. 1.

In the drawing I have illustrated my invention as applied to a novelly formed article of manufacture which, in this instance, is a so-called kick plate for application to the so-called splash pan or side splasher of an automobile, which splash pan connects the inner edges of the running board to the chassis frame and extends between the front and rear fenders. These kick plates are adapted to be applied to the splash pans beneath the doors of the automobile body so as to prevent the splash pan being kicked and marred by one entering the car. Generally, they are employed not only to protect the splash pan but also as cover plates for openings formed in the splash pan, in order that access may be had to the battery, tool box or other adjunct of the automobile supported beneath the body inwardly of the splash pan.

While I have shown my invention embodied in the above named article of manufacture, it is not confined to the same but may be employed to advantage in articles shaped somewhat differently than as herein illustrated and adapted to be employed for a different purpose.

The rubber-steel article here illustrated is somewhat L-shaped in cross-section, being provided with a main or body portion which may be flat or slightly curved as here shown, and which along one edge is bent at substantially right angles. In this instance the bend is made on a fairly large radius, as is desirable when the invention is embodied in an article employed for the particular purpose mentioned above, but when employed for other purposes the radius of curvature at the bend may be considerably sharper than shown.

Furthermore, the rubber-steel article herein illustrated is composed of a metal base 10 generally formed of sheet steel shaped as described above with one side, including the angular bent portion, completely covered by a layer of rubber 11 which is molded and vulcanized in contact with the metal base 10 and is secured thereto in the manner hereinafter described.

It is a desirable, but possibly not in all instances a necessary feature, that the rubber have a relatively thick and preferably rounded marginal rib $11^a$ which extends all around the margin of the article, and that it be relatively thin inside the marginal bead or rib $11^a$. The inner relatively thin layer of rubber, which is here designated $11^b$ and which, of course, is formed integral with the marginal rib, may have any suitable configuration. It may be plain or smooth but is preferably ribbed or corrugated, as indicated in the drawing.

At the center of the device I have shown an opening 12 which extends through the rubber covering and metal base, this opening being provided in this instance to accommodate a key operated or handle operated portion of a locking device by which the kick or cover plate can be locked in place or removed to give access to the opening behind it. The particular locking means employed for this purpose is not material to the present invention, and, therefore, the locking means and whatever members may be provided on the inner or rear side of the metal base 10 to accommodate the same are not illustrated.

It is very important, especially when the rubber-steel article is employed where it is subjected to very rough usage, as when applied to an automobile, that the rubber and steel be very securely attached or fastened together. This secure attaching of the rubber and steel is attained by the present invention which comprises several features which jointly contribute to the attainment of excellent results.

In carrying out this part of the invention, the rubber is not only interlocked with the metal base at points and in a manner such as to produce the best results, but is caused also to adhere strongly to the metal between the points at which the rubber and metal are positively interlocked.

To secure the strong adherence of the rubber to the steel between the points at which the parts are positively interlocked, I employ a plate having a surface roughness or surface porosity inherent to hot passed steel; that is to say, I employ a sheet the final rolling of which is imparted while the sheet is in a hot state, thereby obtaining a surface roughness or porosity which is peculiarly efficacious in securing a bond between the rubber and steel and which surface roughness or porosity is substantially eliminated in sheets which are generally employed in automobile body work, and whose final rolling is obtained while the sheets are in a cold state.

By employing for this purpose sheet metal or sheet steel which received its final rolling while in a hot state, when the rubber and metal base are placed in a vulcanizing press and subjected to great pressure so as to cause the rubber to have the desired shape and surface configuration, all parts of the rubber sheet are pressed so firmly against the metal base that the rubber is forced into the minor interstices or against the roughened surface, and, accordingly, after the vulcanization the rubber is found to adhere strongly to the base.

Additionally, I prefer to employ two types or forms of mechanical interlock between the rubber and base, as follows: Along the thickened margin formed by the marginal bead or rib 11ª, metal tongues or straps 13 are struck up and these extend into the marginal rib, as illustrated in the drawing. During the molding operation in the vulcanizing press, the soft or uncured rubber is forced under these straps and down through the perforations formed by striking up the metal to form the straps so that in the final or finished product the rubber and steel are interlocked at fairly closely spaced points along the margin of the rubber where the greatest holding action is desired.

Additionally, the metal base inside of the continuous row of marginal struck up straps is provided with a great many perforations, and in the molding operation in the vulcanizing press, the rubber is squeezed down through these perforations, and on the under side of the base the rubber is expanded to form the equivalent of rivet heads indicated at 14, rivet heads being formed also where the rubber is squeezed through the slots formed by striking up the straps 13, as best indicated in Figure 4.

Thus it will be seen that along the margin of the sheet metal base and rubber covering where the rubber is relatively thick, the rubber and base are locked together by portions of the base struck up and embedded in the thickened marginal portion of the rubber, and inside the marginal rib where the rubber is relatively thin, and in fact, generally too thin to permit the use of struck up portions, the interlocking is secured by perforating the base and by causing the rubber to fill the perforations and to have enlarged heads on the lower side of the base. Additionally, I attain the advantage, as already explained, of employing a plate having a surface roughness or porosity inherent to hot passed steel and thereby obtain strong adherence between the rubber and steel between the locking projections 13 and between the rubber filled perforations of the base.

It might be added that the enlarging of the rubber where it is squeezed through the openings formed in the base is obtained by suitably forming the lower mold member of the press so that this member will have slight depressions which will permit the expanding of the rubber to form the equivalent of rivet heads on the lower side of the base.

While I have shown locking projections struck up from the metal base in the form of straps, the struck up metal employed to cause a mechanical interlock need not be in the form of straps but may be equivalently formed projections suitable in shape for the intended purpose.

While I have shown the preferred form of the invention I do not wish to be confined to the precise details or arrangements illustrated but aim in my claim to cover all modifications which do not involve a departure from the spirit and scope of the invention.

Having thus described my invention what I claim as new is:

A rubber steel article such as described, comprising a sheet metal body with locking projections struck up from its margin and with perforations inside its margin, and a rubber covering molded and vulcanized to one side thereof, the rubber having a thickened margin and in the molding operation being positively interlocked with the body by the projections which extend up into the thickened margin and by the rubber being squeezed through the perforations inside the margin.

In testimony whereof, I hereunto affix my signature.

BUDD BRONSON.